(No Model.)  5 Sheets—Sheet 1.

A. M. BURNHAM.
MACHINE FOR MAKING WEDGES.

No. 297,563. Patented Apr. 29, 1884.

WITNESSES
INVENTOR
Attorney (No Model.) 5 Sheets—Sheet 2.
A. M. BURNHAM.
MACHINE FOR MAKING WEDGES.

No. 297,563. Patented Apr. 29, 1884.

WITNESSES
INVENTOR
Arthur M. Burnham
By H. A. Seymour
Attorney (No Model.)  5 Sheets—Sheet 3.
A. M. BURNHAM.
MACHINE FOR MAKING WEDGES.
No. 297,563.  Patented Apr. 29, 1884.
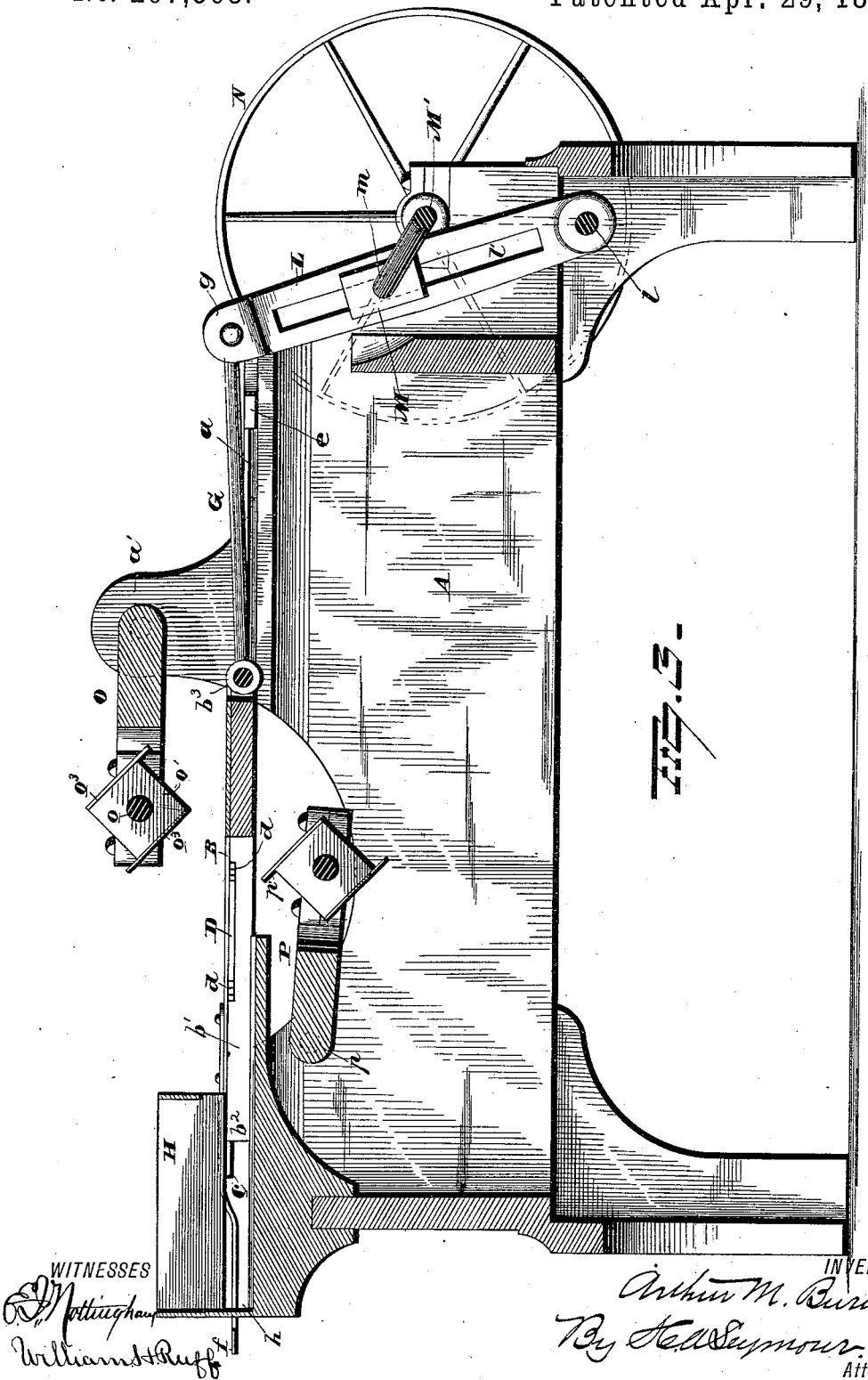
WITNESSES
INVENTOR (No Model.)
5 Sheets—Sheet 4.
A. M. BURNHAM.
MACHINE FOR MAKING WEDGES.
No. 297,563. Patented Apr. 29, 1884.
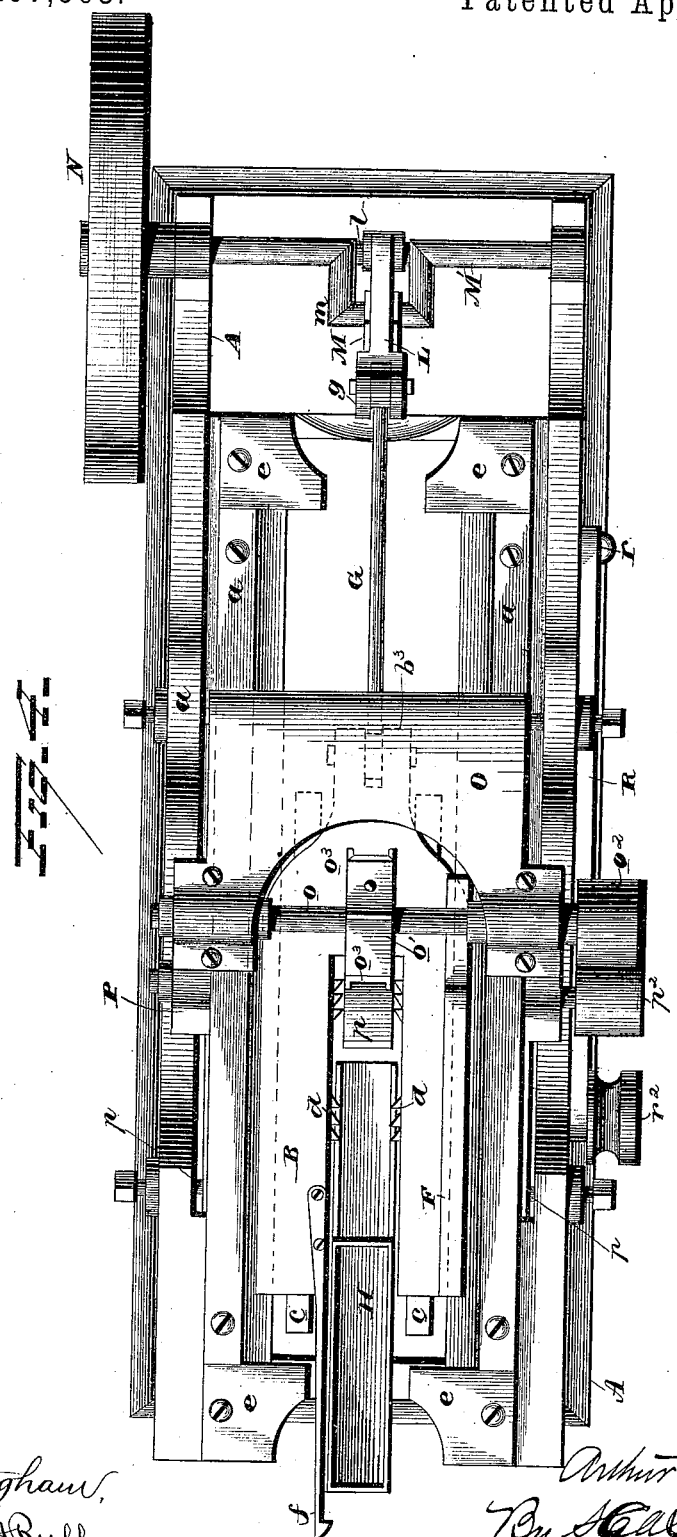
WITNESSES
INVENTOR (No Model.)    5 Sheets—Sheet 5.
A. M. BURNHAM.
MACHINE FOR MAKING WEDGES.
No. 297,563.    Patented Apr. 29, 1884.
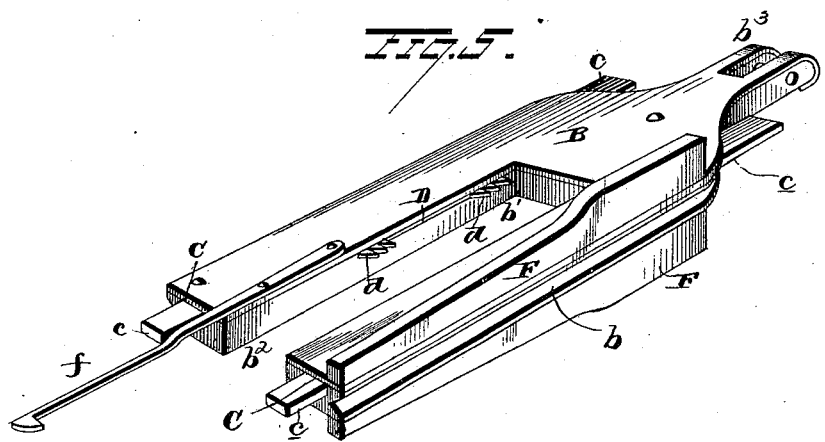
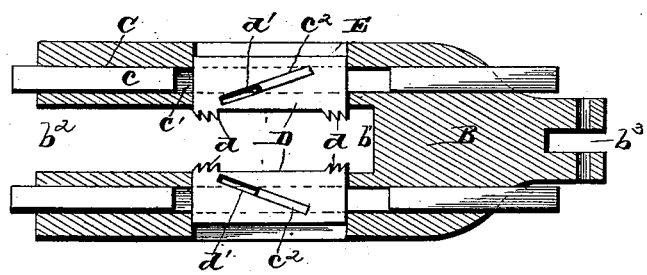
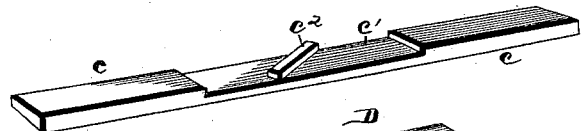
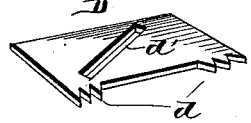
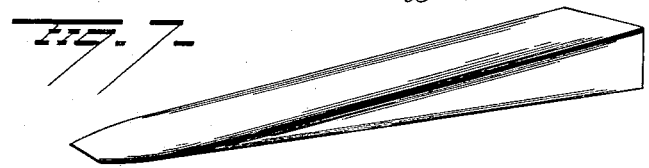
WITNESSES
INVENTOR
Arthur M. Burnham
By H. A. Seymour,
Attorney
N. PETERS. Photo-Lithographer, Washington, D. C.

UNITED STATES PATENT OFFICE.

ARTHUR M. BURNHAM, OF GARDINER, MAINE.

MACHINE FOR MAKING WEDGES.

SPECIFICATION forming part of Letters Patent No. 297,563, dated April 29, 1884.

Application filed December 14, 1883. (No model.)

*To all whom it may concern:*

Be it known that I, ARTHUR M. BURNHAM, of Gardiner, in the county of Kennebec and State of Maine, have invented certain new and useful Improvements in Machines for Making Wedges; and I do hereby declare the following to be a full, clear, and exact description of the invention, such as will enable others skilled in the art to which it appertains to make and use the same.

My invention relates to an improvement in wedges and machines for the manufacture of wedges, the object being to provide machine-made wedges which will be of uniform size and form and have smooth surfaces and uniform taper.

A further object is to provide a machine for the manufacture of my improved wedges of such construction that the wedges may be rapidly and cheaply produced; and with these ends in view my invention consists in a machine-made wedge constructed substantially as stated; and, further, it consists in a machine for making wedges embodying certain features of construction and combinations of parts, as will be fully described, and pointed out in the claims.

Figure 1:
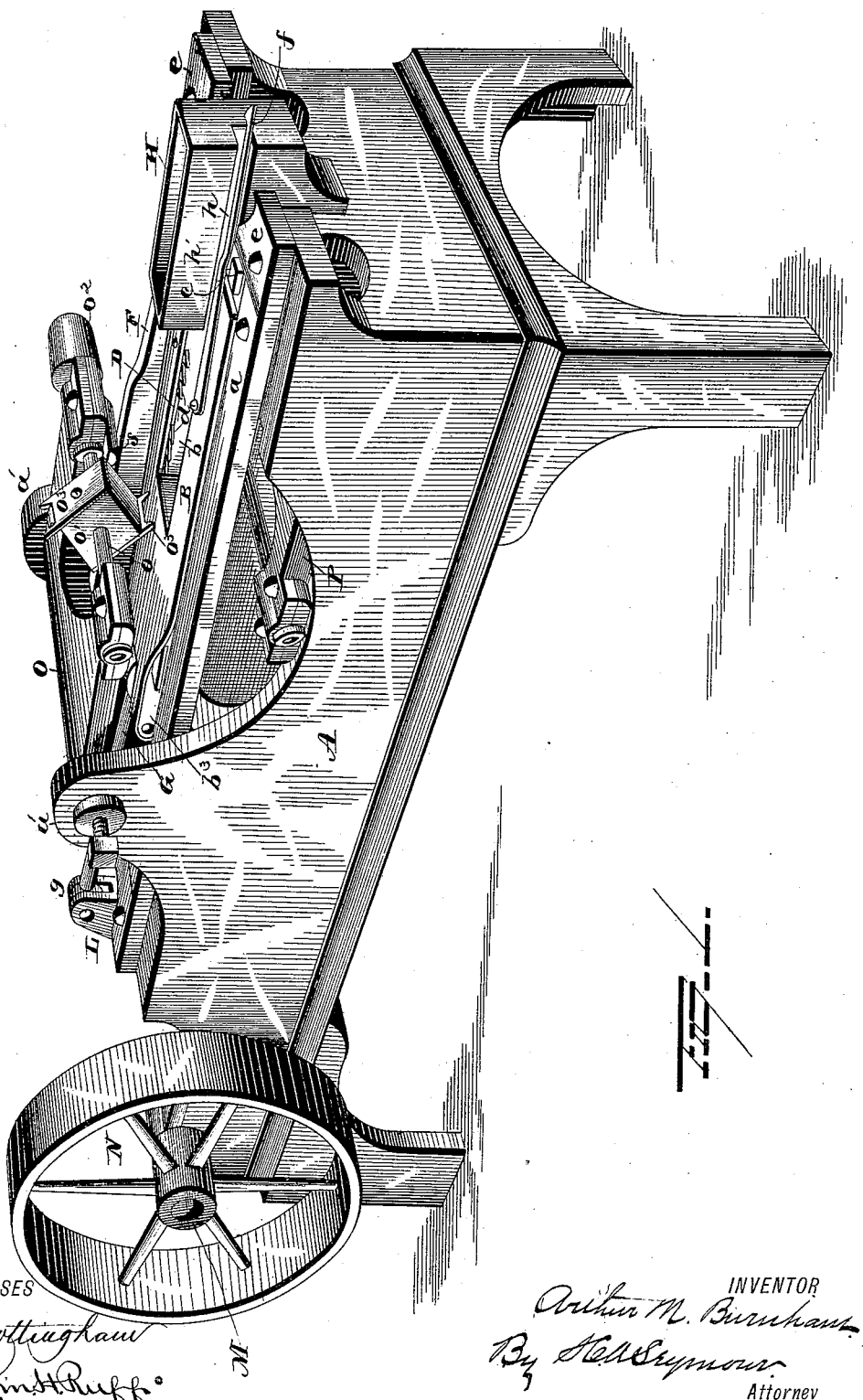
Figure 2:
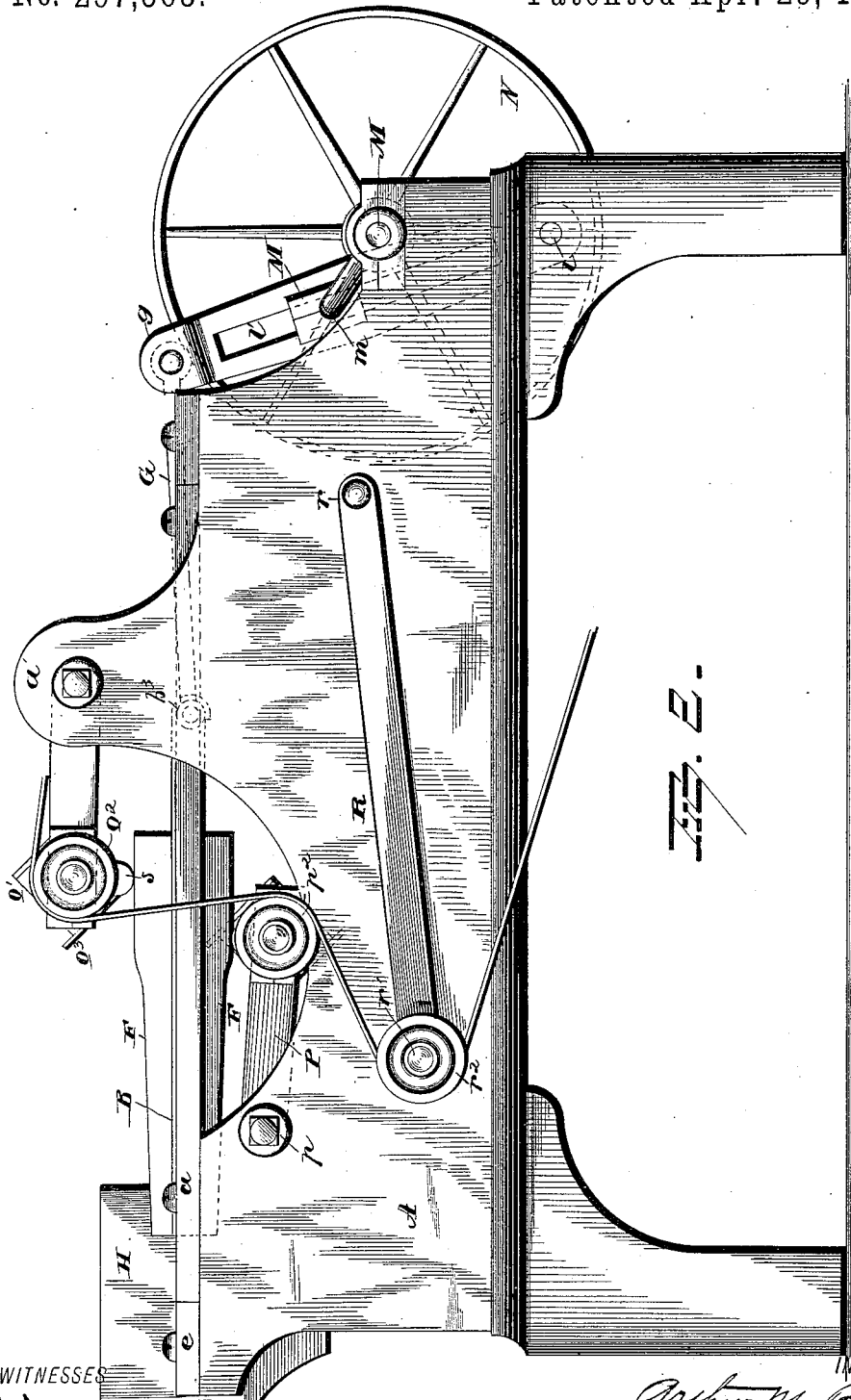

In the accompanying drawings, Figure 1 is a view of the machine in perspective. Fig. 2 is a view in side elevation. Fig. 3 is a longitudinal sectional view. Fig. 4 is a plan view. Figs. 5 and 6 are detached views of the carriage, and Fig. 7 a view of one of my improved wedges.

A represents a frame made of suitable size and strength to support the several parts of the machine.

$a\ a$ represent ways securely fixed on the frame A.

The carriage B is provided with grooved sides $b$, adapted to receive the edges of the ways $a\ a$, and allow the carriage a reciprocating motion on these ways. This carriage B is provided with the rectangular slot $b'$, open at the end $b^2$. It is further provided with the longitudinal covered grooves C, in which the bars $c$ have a longitudinally-reciprocating motion. These bars $c$ are each provided with an elongated recess, $c'$, at the center of which the oblong projection $c^2$ stands diagonally across the bar. The rectangular dogs D are about the thickness of the depth of the recess $c'$, and shorter than the length of said recess. They have teeth $d$ upon one edge, and each is provided with an elongated closed slot, $d'$, extending diagonally across the dog. These slots are adapted to receive the projections $c^2$, and are constructed about as much longer than the projection as the recess $c'$ is longer than the plate D. An opening, E, is made from the groove C into the slot $b'$, sufficiently long and wide to allow the dog D to advance its toothed edge into the slot $b'$. The bars $c$ are made to extend beyond both ends of the grooves in which they slide. Projecting shoulders or stops $e$ are secured to the ways in such positions that the ends of the bars $c$ will come in contact with them just before the carriage reaches its limit moving in either direction. It will thus be seen that when the bars $c$ are placed in the grooves C, with the dogs D in their positions on these bars, so that the slots $d'$ are inclined toward the feed-hopper H, the pressure of the ends of the bars $c$ against the stops $e$ at the feed end will force the bars $c$ forward, and the dogs D being held against longitudinal movement by the ends of the recesses in which they are placed, the projections $c^2$, moving along the slots $d'$, will cause the dogs D to advance toward each other and their teeth to engage the block lying between them. Again, as the opposite ends of the bars $c$ come in contact with the stops $e$ at the other end of the ways, the dogs D will be forced to recede and allow the block to drop.

The carriage B is further provided with the templets or formers F, secured longitudinally upon opposite faces of the carriage B, for the purpose of regulating the depth of cut of the knives $o^3$, and with the rearwardly-projecting feed-hook $f$. This carriage B is reciprocated by means of a pitman, G, one end of which is pivoted in the ends $b^3$ of the carriage and the other in the end $g$ of the lever L. This lever L is pivoted at its lower end on the stationary shaft $l$, and provided with the elongated closed slot $l'$, in which the block M, loosely mounted on the crank $m$ of the shaft M', is locked and allowed to slide. The revolving shaft M', journaled in the frame A, is situated above the stationary shaft $l$, as shown in the drawings, and is provided with the driving-pulley N, which is belted to a suitable pulley upon a counter driving-shaft. The rotary motion of the shaft M' will cause the lever L to oscillate, and thus give the reciprocating motion to the carriage B. The frame A is provided with the upwardly-extending projections $a'$, between which is pivoted the upper cutter-carrier, O. The carrier O is a bifurcated leaf, made of suitable weight and strength, between the arms of which the cutter-shaft $o$, carrying the rotary cutter $o'$ and driving-pulley $o^2$, is journaled. This rotary cutter $o'$ is provided with two knives, $o^3$, (more or less,) the edges of which are so shaped as to give the required curve to the face of the wedge. The lower cutter-carrier, P, is constructed in the same manner as the one just described, and is pivoted to the frame A at $p$ under the ways $a$ and in a reversed position from the carrier O. These carriers are so arranged that the upper cutter, $o'$, occupies a position vertically slightly in advance of the under cutter, $p'$. A belt-tightener, R, has one end pivoted to the frame A at $r$, and the other provided with an arm, $r'$, on which is loosely mounted the pulley $r^2$. The belt which drives the cutter-shafts comes from a counter-shaft and passes under the pulley $p^2$, thence between the pulleys $p^2$ and $o^2$, thence over the pulley $o^2$, thence down and around the pulley $r^2$ on the tightener and back to itself on the counter-shaft. This arrangement of the belt, it will be noticed, gives the cutters an opposite rotary motion, and has a tendency to draw the pulleys $p^2$ and $o^2$ toward each other, thus causing the guides $s$ to hug the templets or formers F. A rectangular hopper, H, adapted to receive a vertical layer of the blocks from which the wedges are formed, is mounted on the end of the frame A. The bottom of the hopper H extends forward into the slot $b'$ of the carriage B to a point near the cutter-knives, and is grooved to guide the block in its motion forward. The hopper H is provided with the elongated slot $h$, along the side $h'$, to receive the feed-hook $f$, and is open on the end toward the carriage a sufficient height from the bottom to allow a single block to pass out. The feed-hook is made of spring metal, and curved at the rear end in such a manner as to allow the hook to pass rearwardly without catching the block.

The operation of the machine is as follows: Oblong blocks of suitable dimensions are placed in the hopper H. The feed-hook $f$, engaging the rear end of the lower block, slides it out of the hopper to a point near the cutters, another block now drops into its place at the bottom of the hopper, and upon the return of the carriage the feed-hook engages the second block and forces it out from the hopper. This return of the carriage B has also brought the ends of the bars $c$ in contact with the stops $e$, and caused the dogs D to advance and engage the first block; hence the same motion which drags the second block from the hopper will carry the first block forward between the cutters. The templets or formers F allow these cutters to approach each other as the block advances, and thus reduce the block to an edge just as the rear end passes between them. The bars $c$ are now brought in contact with the stops $e$ at the opposite end, whereby the dogs D are caused to recede and the completed wedge falls from the machine.

This machine will turn out thirty or more wedges per minute, while the average by the hand methods heretofore in use was only three per minute. Moreover, the wedges formed by my machine are superior to those made by hand.

By referring to Fig. 7 in the accompanying drawings, it will be seen that the faces of my improved wedges are smooth and the taper regular, thus preventing slivered portions of the surface from curling upward as the wedge is driven, and also preventing the wedge from tilting sidewise.

I am aware that slight modifications may be made in different parts of my machine without departing from the spirit and scope of my invention—as, for example, the double cam might be used instead of the diagonal elongated slot in the dogs D, and would produce the required motions and be equivalent in principle. Again, the cutter-shafts might be driven by separate belts running to the counter-shaft, one of them being crossed, instead of the single belt, and the guides held to the templets by a spring; and, still further, the pitman G might be pivoted directly on the crank of the shaft M', said shaft being journaled on a level with the carriage. Hence I do not wish to be understood as limiting myself to the exact construction herein set forth; but, Having fully described my invention, what I claim as new, and desire to secure by Letters Patent, is—

1. In a machine for making wedges, the combination, with two rotary cutters situated in different horizontal planes, and each adapted to be moved toward and away from the other, of a carriage situated between the rollers and provided with devices for clamping the block therein.

2. The combination, with two cutter-carriers pivoted to the machine-frame and two revolving cutters, the shafts of which are journaled, respectively, in the free ends of the carriers, of a reciprocating carriage situated between the cutters and provided with devices for holding a block of wood therein.

3. The combination, with two cutter-carriers pivoted to the machine-frame and two revolving cutters, the shafts of which are journaled, respectively, in the free ends of the cutter-carriers, of a reciprocating carriage running between the cutters and provided with formers, and a single belt for operating the cutters and holding the cutter-carriers in contact with the formers.

4. In a machine for making wedges, the combination, with two cutter-carriers pivoted to the machine-frame, and cutters journaled, respectively, in the free ends of said carriers, of a carriage provided on its opposite faces with formers, against which the cutter-carriers rest, and a belt for holding the cutter-carriers in contact with the formers.

5. In a machine for making wedges, the combination, with rotary cutters, of a carriage adapted to reciprocate between the cutters and provided with dogs, which latter automatically engage the block of wood, carry it between the cutters, and automatically discharge it.

6. In a wedge-machine, the combination, with a carriage mounted upon ways, and provided with devices for automatically engaging and releasing the blocks, and further provided with formers for regulating the shape of the wedge, of an upper and lower rotary cutter and devices whereby the cutters are held in vertical adjustment, substantially as set forth.

7. The combination, substantially as before set forth, of the cutter, the reciprocating carriage, the hopper, and a feeding-hook secured to the carriage, and adapted to draw a blank from the hopper at each reciprocation of the carriage.

8. The combination, substantially as before set forth, of the rotary cutters, the reciprocating carriage interposed between said cutters, the hopper, and a feeding-hook secured to the carriage and adapted to draw a blank from the hopper at each reciprocation of the carriage.

9. In a wedge-machine, the combination, with rotary cutters journaled in swinging frames, of a carriage mounted upon ways and provided with automatic devices for grasping and releasing the blocks, and mechanism whereby the carriage is reciprocated and the cutters rotated, substantially as set forth.

10. In a wedge-machine, the combination of swinging frames having rotary cutters journaled therein, automatically-operated dogs adapted to grasp, feed, and release the blocks, and formers for controlling the converging motions of the cutters, substantially as set forth.

11. In a wedge-machine, the combination, with two rotary cutters driven by a single belt and having opposite rotary motions, of a carriage adapted to slide upon ways and provided with an automatic clamping device, a hook adapted to engage a block in the hopper, and templets for determining the angle of the wedge, and the ways, substantially as set forth.

12. In a machine for making wedges, the combination, with a suitable frame, a reciprocating carriage, and revolving cutters, of a slotted lever pivoted at one end to the frame, a pitman connecting the opposite end of said lever to the carriage, and a crank journaled to the frame and engaging the slotted lever, substantially as and for the purpose set forth.

13. The combination, with suitable cutters and a reciprocating carriage, the latter provided with an oblong open slot, of sliding bars situated on opposite sides of the slot and projecting from both ends of the carriage, the said bars being provided with diagonal lugs, and dogs provided with diagonal slots in which the lugs of the said bars rest and move, and the stops secured to the frame against which the bars abut, substantially as set forth.

In testimony whereof I have signed this specification in the presence of two subscribing witnesses.

ARTHUR M. BURNHAM.

Witnesses:
FREDERIC DANFORTH,
WASHBURNE BENJAMIN.